United States Patent [19]

Brewer

[11] Patent Number: 4,580,519
[45] Date of Patent: Apr. 8, 1986

[54] LOW TIRE PRESSURE WARNING DEVICE

[76] Inventor: Howell K. Brewer, 4002 Aqua Ct., Dunkirk, Md. 20754

[21] Appl. No.: 201,857

[22] Filed: Oct. 29, 1980

[51] Int. Cl.$^4$ .............................................. B60C 23/02
[52] U.S. Cl. ..................................... 116/34 R; 116/70
[58] Field of Search ................... 116/34 R; 73/146.2, 73/146.3; 152/330 R, 330 RF

[56] References Cited

U.S. PATENT DOCUMENTS

| | | | |
|---|---|---|---|
| 1,195,883 | 8/1916 | Wells | 116/34 R |
| 1,364,300 | 1/1921 | Parr | 116/34 R |
| 1,445,043 | 2/1923 | Sampson et al. | 116/34 R |
| 1,488,861 | 4/1924 | Brown | 116/34 R |
| 2,723,700 | 11/1955 | Caldwell | 116/34 R |
| 3,154,048 | 10/1964 | Neu | 73/146.2 X |
| 3,472,197 | 10/1969 | Poole | 116/34 |
| 3,496,903 | 2/1970 | Adahan | 16/67 R X |
| 3,659,264 | 4/1972 | Barabino | 340/58 |
| 3,719,159 | 3/1973 | Davis | 116/34 |
| 3,818,435 | 6/1974 | Hill et al. | 340/58 |
| 4,134,102 | 1/1979 | Stewart et al. | 340/58 |
| 4,235,184 | 11/1980 | Schiavone | 116/34 R |
| 4,262,724 | 4/1981 | Sarkissian | 152/330 RF |

FOREIGN PATENT DOCUMENTS 2229604  6/1972  Fed. Rep. of Germany ..... 73/146.2

Primary Examiner—Daniel M. Yasich
Attorney, Agent, or Firm—Otto M. Wildensteiner; Harold P. Deeley, Jr.

[57] ABSTRACT

A device contained entirely within a tire for indicating when the pressure within the tire has fallen below a certain level. The device includes a releasable member within an enclosure; when the pressure falls below a certain level the member is released, whereupon it rolls around within the enclosure. The noise it makes while rolling around within the enclosure alerts the driver to the fact that the tire pressure has gotten low.

10 Claims, 2 Drawing Figures

LOW TIRE PRESSURE WARNING DEVICE

STATEMENT OF GOVERNMENT INTEREST

The present invention was made by an employee of the U.S. Government and may be made or used by or for the Government without the payment of any royalties thereon or therefor.

BACKGROUND

Numerous government and industry studies have shown that passenger car and truck operators are very negligent about maintaining proper inflation pressure in their tires. The effects of low tire pressure are threefold: First, the tire life is considerably reduced because of greatly increase tread wear due to high tire heat build-up. Second, tire rolling resistance is greatly increased resulting in higher gas consumption. Lastly, tire cornering and traction properties are severely degraded which in turn result in poor handling and braking performance of the vehicle. It is estimated by NHTSA that each year 670 lives are lost because of low tire pressure, and that the cost of accidents related to this amounts to $350 million. In addition, the fuel economy penalty of low tire pressure on cars and trucks is estimated at over $700 million annually.

Numerous devices have been developed to date to warn drivers of low tire pressure. Generally these devices fall into two categories: The first consists of some type of active pressure sensor which monitors tire pressure and gives a reading or warning on some type of visual electronic display mounted in the driver's compartment. Such devices are complex and very costly, and consequently have not found wide acceptance by users. The second type of device that has been developed is one which mounts in or replaces the normal inflation valve stem. These devices rely on a visual indication, such as a pop-up plunger, to indicate low tire pressure. While such devices are relatively inexpensive and simple they suffer from a number of problems. The most significant problem is that these devices violate the primary pressure seal at the tire inflation port. This raises a serious issue of reliability which is probably responsible for keeping all such devices off the market to date. Also, the operation, reliability and calibration of these devices are questionable when exposed to the mud, ice, snow, and salt involved in winter weather driving. Finally, it is highly unlikely that such devices would offer sufficient motivation to the driver to inflate his tires, especially in inclement weather. The Low Pressure Warning Device described herein circumvents all of these problems.

OBJECTS OF THE INVENTION

It is an object of the present invention to provide a low tire pressure warning device which does not violate the primary pressure seal of the tire.

It is a further object of the invention to provide such a device which does not depend on contact with any part of the tire for operation.

It is a further object to provide such a device that does not require a source of external power for its operation.

It is a further object to provide such a device which has a minimum of moving parts.

It is a further object to provide such a device which does not have any critical tolerances in its parts.

It is a further object to provice such a device which is completely fail-safe.

It is a further object of the invention to provide a harmless but nuisance type of warning to motivate operators to service their tires even in inclement weather.

SUMMARY

Briefly, the present invention is a device which is fastened to the inside of a vehicle's wheel, completely within the tire, which indicates when the pressure within the tire has fallen below a pre-determined level. It compromises a ball or other member that is releasably held within a housing by either a magnet or a set of gripping fingers. When the tire pressure is at or above the proper level the ball is held rigidly; when the pressure falls below the proper level the ball is released and it rattles within the housing, alerting the driver to the low pressure within the tire.

In each embodiment the release mechanism is a sealed bellows; when the tire pressure falls below a certain level the bellows elongates enough to release the ball.

DESCRIPTION OF THE PREFERRED EMBODIMENT

Figure 1:
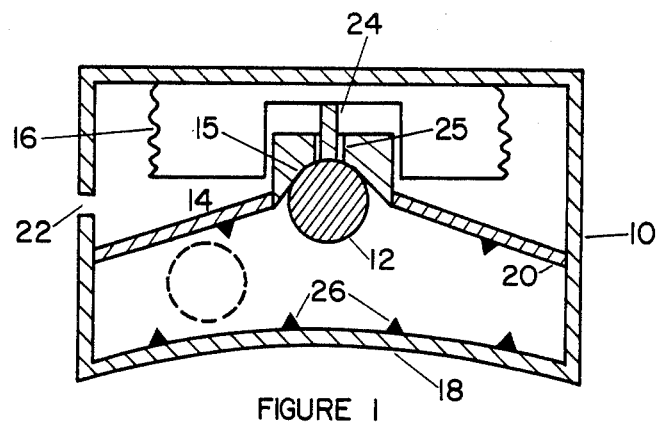
FIG. 1 shows a section of a device according to the present invention wherein the releasable member is magnetically held in its inoperative position.

FIG. 1 shows the embodiment wherein the member (a ball) is magnetically retained when the tire pressure is at its correct level. Enclosure 10 has contained within it member 12, permanent magnet 14, and sealed bellows 16 which are the major components of the device. The bottom surface 18 of housing 10 is radiused to fit the wheel on which it is mounted, as will be explained later. Magnet 14 is supported by interior wall 20 which in turn is supported by the sidewalls of enclosure 10. Bellows 16 is fastened to the top surface of enclosure 10 as shown and surrounds magnet 14. Port 22 in enclosure 10 allows the pressure within the tire to communicate with the interior of the device and act on sealed bellows 16 as will be explained later.

Magnet 14 has depression 15 in one of its sides which ball 12 fits in when the tire pressure is correct; rod 24 which is attached to bellows 16 fits in hole 25 in the center of the depression which extends through the magnet.

Operation of this embodiment is as follows. When the pressure in the tire is at its proper level, as shown in FIG. 1, ball 12 is held within depression 15 in magnet 14. Ball 12 can be entirely of iron or can be of a mixture of iron and some other material, so long as it can be attracted to and held by magnet 14. The pressure in sealed bellows 16 is such that under these conditions the bellows is compressed so that rod 24 does not contact ball 12. As the pressure within the tire drops, bellows 16 expands and rod 24 starts to push ball 12 out of depression 15 in magnet 14. At some value of tire pressure bellows 16 has expanded to the point where ball 12 is completely free of magnet 14, and it is able to roll around within the chamber defined by bottom surface 18, interior wall 20, and the sidewalls of the device as shown in the dashed lines. As it does so it makes noise when it contacts these surfaces, which alerts the driver to the low pressure within the tire. Projections 26 have been placed as shown to deflect ball 12 from one suface to another in order to increase the amount of noise it makes as it moves within the chamber. As stated earlier, bottom surface 18 is radiused to fit the wheel that the device is to be mounted on. This is to make it easier to attach the device to the wheel, and to allow the best possible coupling of the noise from the device into the vehicle where it will be heard by the driver.

With the device in this position the centrifugal force developed when the wheel rotates at high speeds will force the ball against the magnet rather than trying to pull it away from the magnet. This means that a heavier ball can be used, which will make more noise than a light ball; it also means that a smaller and weaker magnet can be used, which will allow the entire device to be lighter in weight.

After the tire pressure has been brought back to its proper level bellows 16 will be compressed to the length shown in FIG. 1 and rod 24 will no longer project through hole 25 in magnet 14. The next time that the wheel is rotated to the position where the device is on the bottom, ball 12 will roll into depression 15 in magnet 14 and be captured; it will say there until the pressure in the tire drops to the point where rod 24 forces it out again.

The pressure in bellows 16 will be dependent on the length of stroke of rod 24 and the thickness of magnet 14; obviously, any combination of pressure and thickness of magnet 14 that results in the ball being forced out of the depression at the desired tire pressure will work.

It is preferred that enclosure 10 be made of metal, since this will make more noise than a non-metallic enclosure when struck by ball 12.

Figure 2:
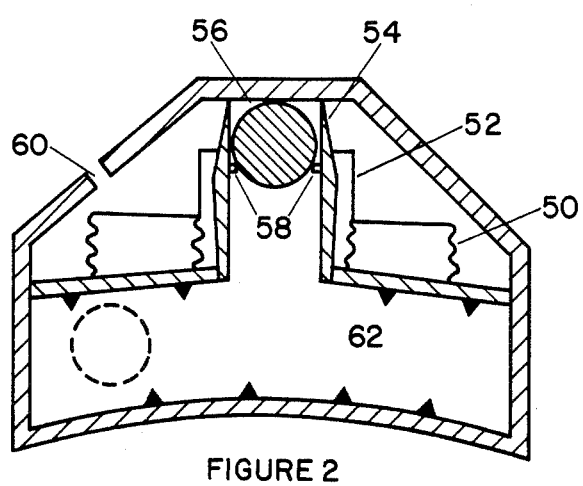
FIG. 2 shows a section of a device according to the present invention wherein the releasable member is mechanically held in its inoperative position.

FIG. 2 shows the configuration wherein the ball is mechanically, instead of magnetically, held in its inoperative position as long as the tire pressure is correct. In this embodiment bellows 50 has arms 52 on it which contact and encircle all of fingers 54; fingers 54 grip ball 56 and keep it from rolling around. Also on fingers 54 are stops 58, which help retain ball 56.

In this embodiment, tire pressure is communicated through port 60 and acts on bellows 50. When the tire pressure drops, bellows 50 lengthens and arms 52 ride up fingers 54 which are spring-loaded outward, allowing them to open. When the pressure has reached a certain value the fingers have opened enough to allow ball 56 to fall into chamber 62 as shown in the dashed line, wherein it makes noise as it rolls around.

When the tire pressure has fallen low enough to release ball 56 and the tire is to be pumped up again, it will be necessary to first rotate the wheel so that the device is on the bottom of the wheel so that ball 56 can drop within spread-apart fingers 54. When the tire pressure is increased again, arms 52 will be pulled down on fingers 54 as bellows 50 contracts and will cause them to close up; ball 56 will then be held in its inoperative position once again. If ball 56 were not within fingers 54 before the tire pressure were increased it would be free to continue to make noise as before because it cannot drop into its inoperative position after the fingers are closed.

Both of the above embodiments are small enough to fit on the inside of a wheel; since they do not project beyond the drop center portion, they will not injure the tire if it is run flat for a distance. Likewise, since there is no violation of the primary pressure seal anywhere there is no increase in the possibility of a leak due to the presence of the device.

Since each embodiment represents a weight on one side of the wheel, it will be necessary to add counterweights to the other side of the wheel. In the case of the magnetically held device, however, the counterweight could be another low tire pressure warning device, since it is not necessary that these devices be oriented in a particular way before the tire pressure is increased.

Both embodiments are very straight-forward and have no critical tolerances, hence are easy to manufacture and are very rugged. The only sensitive part is the sealed bellows, but these have been in use for a long time and are very reliable. Hence either embodiment could be placed on a wheel and operate without problems.

What is claimed is:

1. A tire pressure warning device comprising: a wheel; a tire mounted on said wheel; and means mounted on said wheel entirely within said tire for indicating the pressure within said tire, said means for indicating the pressure comprising means independent of said tire for making noise as the tire rotates whenever the pressure goes below a pre-set minimum.

2. A warning device as in claim 1 wherein said means for making noise comprises means for releasably holding a member in a fixed position and releasing said member when the pressure goes below a pre-set minimum.

3. A warning device as in claim 2 wherein said means for releasably holding a member comprises an enclosure mounted on said wheel, a member within said enclosure, means for holding said member, and means for releasing said member.

4. A warning device as in claim 3 wherein said means for releasing said member comprises a sealed bellows.

5. A warning device as in claim 4 wherein said means for holding said member comprises a magnet having two parallel sides.

6. A warning device as in claim 5 wherein said magnet has a depression in one side for receiving therein said member and a hole in the bottom of said depression which extends through said magnet to its other side; said bellows is positioned adjacent said other side with its axis parallel to said hole in said magnet; said bellows has a rod on it which extends into said hole in said magnet; and said enclosure retains said member when said member is released from said magnet.

7. A warning device as in claim 6 wherein said bellows and said rod are sized such that said rod does not contact said member when the pressure in the tire is at or above said preset minimum but said rod forces said member out of said depression when the pressure drops to said pre-set minimum.

8. A warning device as in claim 4 wherein said means for holding said member comprises a plurality of flexible members forming a cavity for receipt therein of said member, said flexible members being resiliently biased outward from said cavity.

9. A warning device as in claim 8 including means for forcing said flexible members inward toward said cavity.

10. A warning device as in claim 9 wherein said forcing means comprises an encircling member which encircles said flexible members, the axis of said bellows is parallel to said flexible members, and said encircling member is attached to said bellows.

* * * * *